Aug. 11, 1931.  B. H. SMITH  1,818,964
TURPENTINE WORKER'S TOOL
Filed Dec. 3, 1928  2 Sheets-Sheet 1
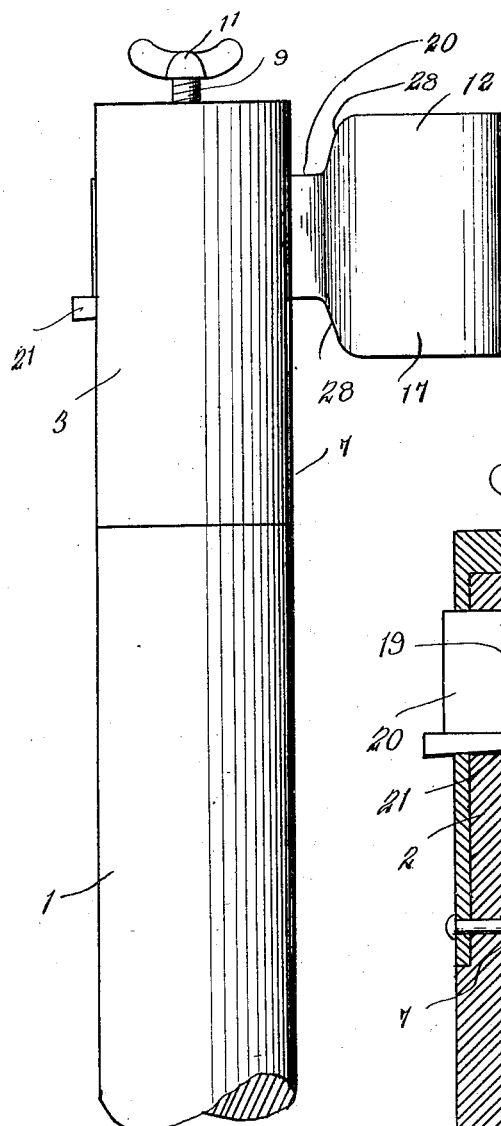
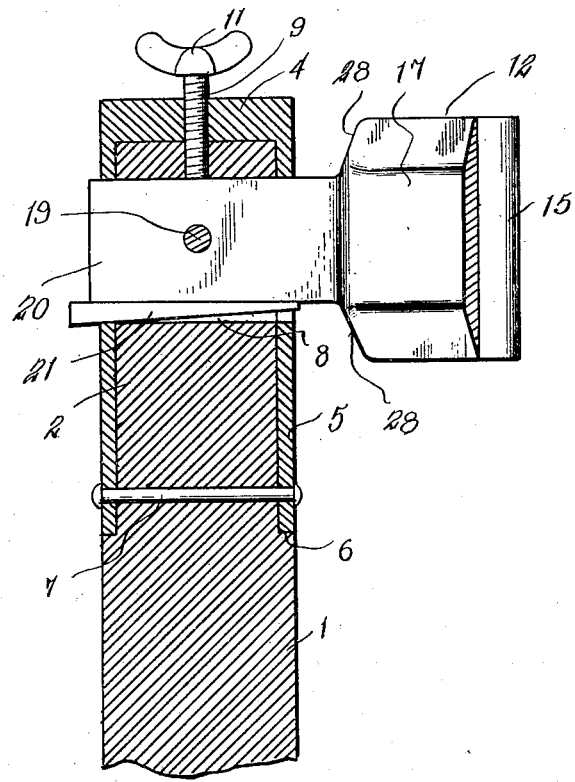
Inventor
B. H. Smith
By Lacey & Lacey, Attorneys Aug. 11, 1931.  B. H. SMITH  1,818,964
TURPENTINE WORKER'S TOOL
Filed Dec. 3, 1928  2 Sheets-Sheet 2
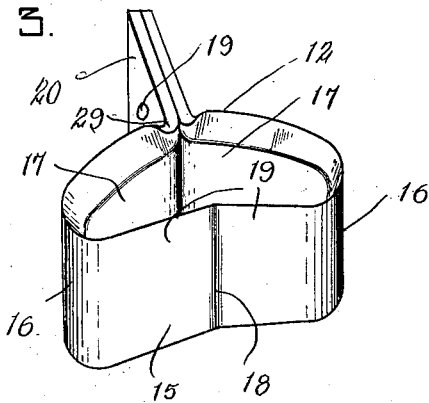
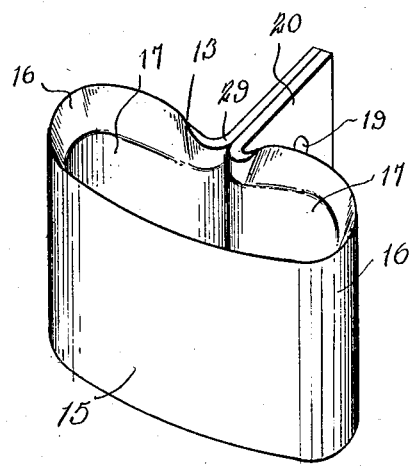
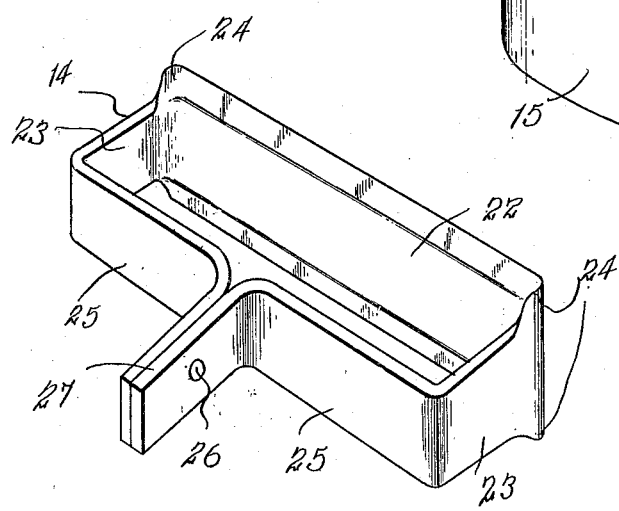
Inventor
B. H. Smith
By Lacey & Lacey, Attorneys Patented Aug. 11, 1931

1,818,964

UNITED STATES PATENT OFFICE

BENNIE H. SMITH, OF MANATEE, FLORIDA, ASSIGNOR OF ONE-HALF TO A. B. MURPHY, OF MANATEE, FLORIDA

TURPENTINE WORKER'S TOOL

Application filed December 3, 1928. Serial No. 323,388.

This invention relates to tools and more particularly to a tool intended for use by turpentine workers and by means of which bark and wood may be cut from pine trees in order to form a shade streak and allow sap from which turpentine is made to flow out of the tree or gum and rosin which forms in the fall scraped from the tree.

One object of the invention is to provide a tool of this character including a staff having its forward end reinforced by a cap fitted snugly thereon, a passage being formed through the cap and portion of the staff enclosed thereby so that a working head or blade may have its shank thrust through the passage and securely but releasably held therein.

Another object of the invention is to allow a selected one of a number of working heads to be connected with the handle by having its shank pass through the passage formed therein and thereby allow the same staff or handle to be used and the blades or working heads substituted one for another according to the type of work to be done.

Another object of the invention is to permit the angular relation of the working head to be adjusted relative to the axis of the staff or handle and thereby allow the head to be so set that the tool may be very easily used.

Another object of the invention is to provide the tool or implement with a working head which may be cheaply made and of such shape that it may be very easily sharpened by means of a file or whetstone.

The invention is illustrated in the accompanying drawings, wherein

Figure 1 is a view showing the improved tool in side elevation with a portion of the staff broken off, Fig. 2 is a longitudinal sectional view through the staff and working head shown in Fig. 1, Fig. 3 is a perspective view of the working head or shade streak puller shown in Fig. 1, Fig. 4 is a perspective view of a modified form of working head or straight puller, and Fig. 5 is a perspective view of another form of working head designated a scrape iron.

The improved tool or implement includes a staff or handle 1 formed of wood so that it will be light in weight while at the same time strong. This staff may be of any length desired and it may also be of any thickness desired. The forward end portion of the staff is reduced in thickness to form a neck 2 and this neck is enclosed by a cap 3 formed of metal and having a head 4 at its outer end from the margins of which extend annular walls 5 thereby defining a socket into which the neck 2 snugly fits. The annular walls bear against an annular shoulder 6 about the inner end of the neck, and in order to firmly retain the cap in place, there has been provided a securing pin 7 which extends transversely through the neck and has its ends protruding from the walls of the cap and headed as clearly shown in Fig. 2. Therefore, the cap will be firmly secured upon the neck and there will be no danger of its working loose. A passage 8 is formed transversely through the neck and walls of the cap and this passage is rectangular and preferably oblong in cross section so that, when the shank of a working head is fitted into the passage, the shank will be prevented from turning in the passage. It is important to prevent the shank of the working head from slipping out of its proper position in the passage and there has, therefore, been provided a set screw 9 which passes through a threaded opening 10 in the head 4 of the cap and at its outer end is formed with a turning head 11 so that the set screw may be easily rotated.

In Figs. 3, 4 and 5, there have been shown modified types of working heads. These heads are indicated in general by the numerals 12, 13 and 14 and the heads 12 and 13 are employed to strip bark from the pine trees, whereas the head 14 is employed to scrape gum from the bleeding surface of a tapped tree. The head 12 and the head 13 are each formed from a strip of metal which is bent in spaced relation to its ends to form a blade 15 having rearwardly curved end portions 16 merging into arms 17 which extend toward each other and meet intermediate the width of the blade 15 but in spaced relation rearwardly thereof. The blade 15 of the head 12 is bent intermediate its width, as shown at 18, to provide diverging portions 19, whereas the blade 15 of the head 13 is straight throughout its width and the arms 17 of the head 12 converge rearwardly from the curved portion 16, thereby providing a substantially triangular head, whereas the arms 17 of the head 13 extend substantially parallel to the blade 15. Each head is open throughout its depth and, therefore, a clear passage is formed through which bark and chips cut from a tree by the sharpened upper and lower edges of the head may freely pass. In some cases the bark may be easily removed by a head having a straight blade 15, whereas in other cases it has been found better to have the blade bent intermediate its width to form a substantially triangular head. The extreme end portions of the strip of metal from which a head is formed are bent to extend rearwardly therefrom in contacting relation to each other and these end portions which are unsharpened are firmly secured in contacting relation to each other by welding or through the medium of one or more rivets 19 in order to form a thick shank 20 of such dimensions that it may be easily passed through the passage 8 formed in the handle. It should be noted that, when the shank is thrust into the passage, it is of less depth than the passage, as clearly shown in Fig. 2, and, therefore, the shank may be tilted in the passage in order to vary its angular relation to the axis of the staff. After the shank has been passed through the passage a wedge 21 is inserted beneath the shank and the set screw 9 tightened until the shank is firmly held in place. The extent to which the wedge is passed into the passage controls the angle assumed by the shank when the set screw is tightened.

The scraper head or scrape iron shown in Fig. 5 is also formed from a strip of metal and this strip is bent in spaced relation to its ends to form a blade 22 having arms 23 extending rearwardly from its ends. The portion forming the blade projects above and below the arms and has these projecting portions sharpened and it should be noted that the strip is bent in slightly spaced relation to the ends of the wide sharpened portion in order to provide rounded ends 24 and thereby eliminate likelihood of the blade catching in the bark or the body portion of the tree when scraping gum from the tree to clear the bleeding surface. The portions forming the arms 23 are bent toward each other, as shown at 25, until they meet and are then bent outwardly in contacting engagement with each other and secured by a rivet 26 to form a shank 27 of such dimensions that it may be fitted into the passage 8 similar to the manner in which the shank of the head 12 is shown in Fig. 2. Since the blade 22 of the head 14 is spaced from the portions 25 thereof, a clear space is established between the front and rear portions of the head and gum or rosin which may tend to collect upon the blade when scraped from the tree may be easily removed and in most cases the gum will be allowed to pass through the head without accumulating therein.

When the tool is in use and it is desired to prepare a tree, the head 12 or the head 13 has its shank passed through the passage 8 and the wedge 21 is then thrust into place. The distance to which the wedge is thrust into the passage will be regulated according to the angle which it is desired to have the head assume when the set screw is tightened. When the set screw is tightened, it bears against the upper edge face of the shank and will force the shank downwardly until the wedge is secured firmly in place. If the wedge is thrust entirely through the passage, the shank will remain at right angles to the axis of the staff when the set screw is fully tightened but if the wedge is only partially passed through the passage, the shank will be forced downwardly and assume an incline position when the set screw is tightened. After the shank has been secured by tightening the set screw, the cutting edge of the blade is engaged with the bark of the tree and by a series of stroking movements the bark may be easily stripped from the tree and the wood cut until a bleeding surface of the desired dimensions and shape has been formed. If it is found that certain portions of the bark or wood cannot be conveniently removed with the blade of the head in use, the cutting head 13 may be substituted for the head 12 or the head 12 set in place instead of the head 13 according to which is in use at the time. It is preferred to have the tree formed with a bleeding surface or shade streak of a concaved formation so that it will be shielded from rain and sun as rain causes the sap to glaze and sun dries it which in either case prevents free flow of the sap. It should be noted that at their inner ends the arms 17 of these two heads are cut from their upper and lower edges, as shown at 28, thereby defining recesses 29 which prevent the sharpened upper and lower edges of these arms from contacting with the walls of the cap 4 when the head is set at an angle and in addition provide extra space through which strips of bark may pass when cut from a tree. These spaces also allow a file or whetstone to be passed through the head and assume the proper angle in order to allow the edges to be easily sharpened by beveling the inner surfaces of the blades and arms. During the all the sap flowing from the tree has a tendency to form gum upon the bleeding surface of the tree instead of flowing freely into a receptacle provided to catch the sap and this gum must be scraped from the tree. In order to do so, the head or scrape iron 14 shown in Fig. 5 is used and its shank is fitted into the passage 8 and secured therein by tightening the set screw. When so tightened, the head will be firmly attached to the staff and the gum or rosin may be easily scraped from the tree by means of the blade 24. In view of the length of the blade, a wide surface may be cleared very quickly and since the head is open rosin and gum scraped from the tree may freely pass through the head without accumulating therein. This formation also allows the blade to be easily sharpened. In view of the fact that the staff is provided at its forward end with a cap entirely covering the same and the passage 8 extends through the walls of the cap as well as through the staff, there will be no danger of its passage being enlarged by becoming worn.

Having thus described the invention, I claim:

1. A tool of the character described comprising a staff, a metal cap enclosing the forward end portion of said staff and having a thick head fitting against the end of the staff and annular walls fitting snugly about the staff, a passage rectangular in cross section being formed transversely through the staff and walls and a threaded opening leading from the passage intermediate its ends through the head of the cap, the said cap serving to reinforce the forward end portion of said staff and the ends of the passage, a set screw in the threaded opening, and a working element having a shank extending through said passage and engaged by the inner end of the set screw.

2. A working head for a tool of the character described comprising a body open at its ends and having an outer wall terminating in inwardly curved portions merging into walls extending rearwardly from the outer wall and leading to a shank extending rearwardly from the rear walls at their intersection, the said walls being sharpened along the upper and lower edges and the outer wall being bent intermediate its width to provide portions diverging outwardly from a point in front of the shank.

3. A working head for a tool of the character described comprising a strip of metal bent in spaced relation to its ends to form an outer wall and side walls extending rearwardly therefrom, the extreme end portions of said strip being bent rearwardly and disposed in contacting relation to each other to form a shank intermediate the width of the head, and means to firmly secure the shank forming portions of said strip against each other.

4. A working head for a tool of the character described comprising a body open at its ends and having an outer wall terminating in inwardly curved portions merging into walls extending rearwardly from the outer wall and leading to a shank extending from the rear walls at their intersection, the said walls being sharpened along the upper and lower edges and the shank being of less depth than the rearwardly extending walls and the adjacent portions of the last-mentioned walls being shaped to define recesses at their intersection with the shank whereby the shank may be angularly disposed in a passage formed through a staff without the head contacting with the staff.

In testimony whereof I affix my signature.

BENNIE H. SMITH. [L. S.]